(No Model.)

J. HOPKIRK.
REVERSIBLE DRIVING GEAR FOR CARS.

No. 529,268. Patented Nov. 13, 1894.

Witnesses,

Inventor,
James Hopkirk

UNITED STATES PATENT OFFICE.

JAMES HOPKIRK, OF SAN FRANCISCO, CALIFORNIA.

REVERSIBLE DRIVING-GEAR FOR CARS.

SPECIFICATION forming part of Letters Patent No. 529,268, dated November 13, 1894.

Application filed February 12, 1894. Serial No. 499,941. (No model.)

*To all whom it may concern:*

Be it known that I, JAMES HOPKIRK, a citizen of the United States, residing in the city and county of San Francisco, State of California, have invented an Improvement in Reversible Driving-Gear for Cars; and I hereby declare the following to be a full, clear, and exact description of the same.

My invention relates to a reversible driving gear for cars.

It consists in certain details of construction which will be more fully explained by reference to the accompanying drawings, in which—

Figure 1:
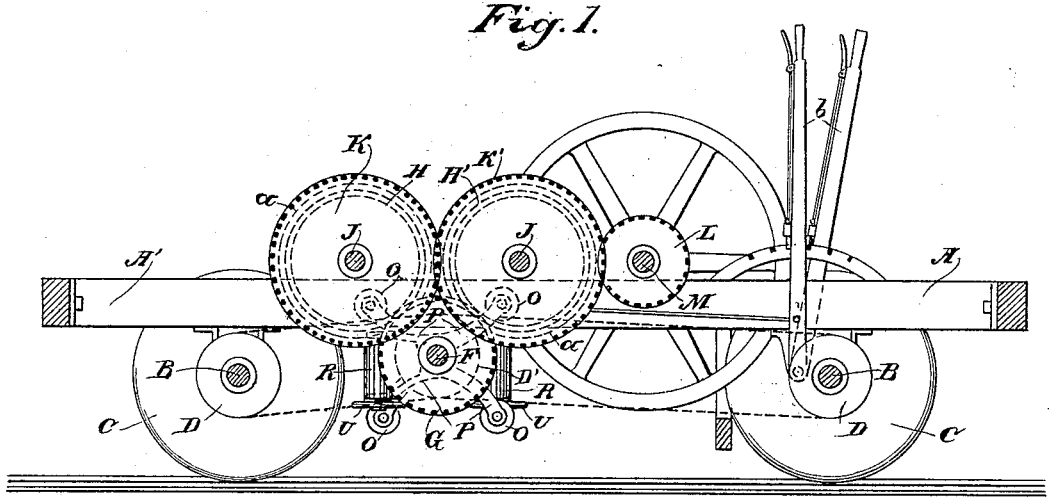
Figure 2:
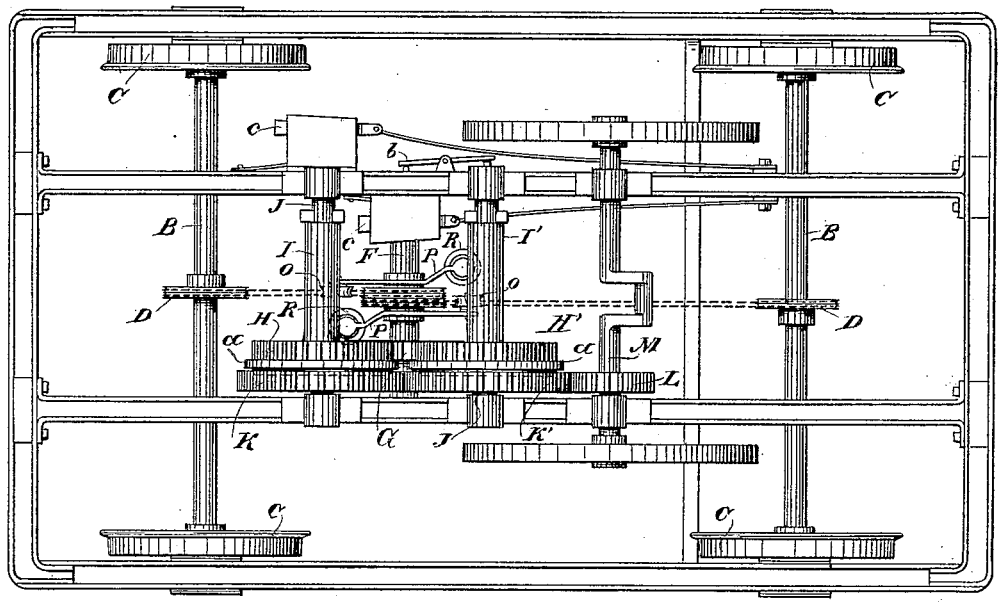
Figure 3:
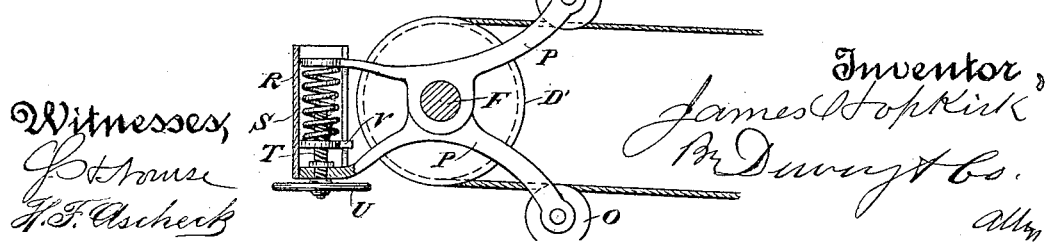

Figure 1 is a sectional elevation. Fig. 2 is a plan view. Fig. 3 is a view of the tension device for the driving rope.

The object of my invention is to provide a mechanism for transmitting power from any suitable engine, motor, or other source, to the traction wheels of a car in such a manner that it may be driven in either direction, quickly reversed, or brought to a standstill without interfering with the continuous running of the motor in one direction.

The drawings in the present case show the application of my invention to a four-wheeled truck which will illustrate its application to a car or vehicle of any construction.

The truck frame A is of rectangular form having the journal-boxes for the axles B of the bearing wheels C attached to each side in the usual or any convenient manner. Intermediate longitudinal bars A' extend between and are secured to the end bars of the frame, and these intermediate bars serve for the attachment of the journal-boxes of all the driving gearing, as well as the engine shaft, the whole being arranged in such narrow compass as to admit of its being placed between the backs of the outwardly facing seats which are usually placed upon each side of a dummy or car.

Upon each of the car axles B is placed a pulley D. I have shown these pulleys, in the present case, made with two or more grooves around the periphery, adapted to receive as many turns of the wire rope which I desire to use in the propulsion of the cars in preference to gearing or chains, and thus give the necessary adhesion and prevent the slipping of the rope upon the drums or pulleys. Intermediate between these shafts, at a convenient point with relation to them, is journaled another shaft F, the boxes of which are fixed upon the frame bars A'. This shaft carries two pulleys D' similar to the pulleys D fixed upon it side by side, one of the pulleys being in line with the pulley D upon one of the wheel shafts, and the other in line with the corresponding pulley upon the other shaft, so that by this connection the wheel shafts B are turned simultaneously in the direction in which the shaft F turns. This shaft has fixed upon it, near one end, a gear wheel G. This gear wheel is engaged by two gears H and H' which are fixed upon sleeves I and I'. These sleeves fit loosely and are slidable upon internal shafts J which extend across the frame and are journaled thereon. Upon these shafts are fixed gears K which engage with each other, and one of these gears meshes with the gear L upon the engine or motor shaft M, so that when power is communicated from the shaft M to the gear L, it is also transmitted to the gears K K' and turns them in opposite directions. The gears H and H' are mounted, preferably removably, upon the backs of friction or clutch plates $a$, and these are adapted to engage with corresponding plates upon the adjacent sides of the gears K and K'.

It will be manifest that when one of the sleeves I or I' is forced along its shaft J until the clutch or friction device engages, it will receive motion from the motor through the corresponding gear K, and this will be transmitted through the gear G to the shaft F which in turn transmits the motion by reason of the driving rope previously described to the bearing wheel axles. If this friction clutch be disengaged and the other one engaged, it will be manifest that the motion of the wheels and that of the car will be reversed.

In order to operate the sleeves and engage either of the friction clutches at will I have shown a mechanism consisting of levers $b$ and wedges $c$ actuated by said levers so as to force either of the sleeves forward upon its shaft with sufficient pressure to engage the friction disks or clutches so that the engaged parts will rotate in unison. This mechanism forms no part of my present application, and I, therefore, have not made a detailed description of it here.

In order to produce the proper tension upon the driving ropes, and to take up any slack which may occur, I have shown a tension apparatus consisting of rollers O mounted upon levers P, which are fulcrumed upon the shaft F. The ends of these levers opposite to the ones carrying the rollers are separated and extend into a tubular casing R within which is a spiral spring S. The tendency of this spring is to separate the ends of the levers so as to bring together their opposite ends carrying the rollers to bring tension to bear upon the driving rope. The end of the upper lever entering the casing rests upon the end of this spring. Through the end of the lower lever, which also enters the opposite end of the casing, passes a screw shank T which is turnable by means of a small hand-wheel U. The shaft of this screw has a collar which holds it in place on the lever so that it rotates without advancing. The screw-threaded part passes through a plate V which presses upon the end of the spring opposite to the upper lever. This plate has a lug extending into a slot in the casing in which it travels, and is thus prevented from rotating.

If it is desired to increase the tension of the spring and corresponding pressure of the rollers upon the rope, it is done by turning the screw and thus causing the plate to advance and compress the spring. The tension is reduced by turning it in the opposite direction. Thus by means of this screw the amount of tension upon the rope is easily regulated by forcing the rollers closer to each other, or relieving the pressure upon them. In this manner any stretching of the rope may be taken up so as to insure its proper working at all times.

Having thus described my invention, what I claim as new, and desire to secure by Letters Patent, is—

1. The combination with the truck frame, the traction wheels thereof, and a motor shaft mounted upon the car and adapted to rotate continuously in one direction, of a mechanism consisting of gear wheels meshed together and mounted upon shafts journaled across the frame, a gear fixed upon the motor shaft and engaging one of said gears whereby the two are rotated in opposite directions, sleeves slidable upon the shafts of said gear wheels carrying clutch or friction plates which are adapted to engage the corresponding plates upon the faces of the gear wheels, and mechanism whereby either of the clutches may be engaged with the oppositely revolving gears, other gear wheels attached to the backs of the friction clutch plates upon the sleeves, an independent gear shaft journaled across the frame and having a gear wheel which is engaged by both of these loose gears whereby its movement is reversed by engaging one or other of the clutches, pulleys fixed upon the independent shaft and other pulleys fixed upon the traction wheel axles and ropes extending around said pulleys with tension devices as described.

2. The combination, with a car truck frame having traction wheels and an engine shaft adapted to rotate continuously in one direction, gear wheels meshed together and fixed upon shafts journaled upon the frame, and a gear upon the engine shaft engaging one of these gears so that they are rotated in opposite directions, sleeves turning loosely upon the gear shafts and friction clutches upon the shafts and sleeves, one of said clutches being engaged to rotate the sleeves in one direction, and the other clutch engaged to rotate said sleeves in an opposite direction, a shaft carrying a gear which engages the gears upon the sleeves and is rotated in opposite directions by the engagement of the clutches, pulleys upon this shaft and upon the wheel axles with endless flexible bands connecting them, and rollers journaled to fulcrumed levers, the opposite ends of which are subjected to a constant spring pressure whereby the pulleys are pressed against the driving bands to maintain their tension as described.

3. The tension device for flexible driving bands consisting of the lever through which the driving pulley shaft turns loosely, rollers journaled in the levers at one end to press upon opposite parts of the driving band, a casing containing a spiral spring standing between the ends of the levers opposite to the rollers, and an adjusting screw by which the pressure of the spring upon the levers is regulated as described.

In witness whereof I have hereunto set my hand.

JAMES HOPKIRK.

Witnesses:
S. H. NOURSE,
H. F. ASCHECK.